United States Patent [19]
Behrendt et al.

[11] Patent Number: 5,314,155
[45] Date of Patent: May 24, 1994

[54] DEVICE FOR SUSPENDING A CABLE SLEEVE ON A SUPPORT CABLE

[75] Inventors: Martin Behrendt, Hagen; Martin Greisinger, Iserlohn; Hans Winterhoff, Schwerte, all of Fed. Rep. of Germany

[73] Assignee: RXS Schrumpftechnik-Garnituren GmbH, Fed. Rep. of Germany

[21] Appl. No.: 848,235

[22] Filed: Mar. 9, 1992

[30] Foreign Application Priority Data

Apr. 9, 1991 [DE] Fed. Rep. of Germany ....... 4111484

[51] Int. Cl.$^5$ ................................................ A47F 5/00
[52] U.S. Cl. ........................................ 248/301; 174/61; 248/340
[58] Field of Search ............... 248/61, 201, 340, 301, 248/214, 215; 24/716; 174/41, 92, 52.1, 61

[56] References Cited

U.S. PATENT DOCUMENTS

| | | | |
|---|---|---|---|
| 1,675,602 | 7/1928 | Faust | 248/61 X |
| 2,812,066 | 11/1957 | Volosin | 248/340 X |
| 2,891,101 | 6/1959 | Koliss | 174/41 X |
| 3,701,835 | 10/1972 | Eisele | 174/41 |
| 3,958,789 | 5/1976 | McKenzie | 248/340 |
| 4,034,902 | 7/1977 | Grillo | 248/340 X |
| 4,992,627 | 2/1991 | Mullaney . | |
| 4,994,630 | 2/1991 | Schilling | 174/92 X |
| 5,136,121 | 8/1992 | Kluska | 174/92 X |

FOREIGN PATENT DOCUMENTS

| | | |
|---|---|---|
| 1640691 | 1/1976 | Fed. Rep. of Germany . |
| 2916734 | 2/1981 | Fed. Rep. of Germany . |
| 3803335 | 8/1989 | Fed. Rep. of Germany . |
| 3805257 | 8/1989 | Fed. Rep. of Germany . |

*Primary Examiner*—J. Franklin Foss
*Attorney, Agent, or Firm*—Hill, Steadman & Simpson

[57] ABSTRACT

The invention provides the suspension device for suspending a cable sleeve or fitting on a support cable. The suspension device includes a strip-shaped securing part which has one end fashioned as a hook and the other end fashioned as a mounting lug for securing to end members of the cable sleeve. Preferably, the securing part is provided with an arrangement to prevent accidental disengagement of the hook from the support cable.

14 Claims, 7 Drawing Sheets

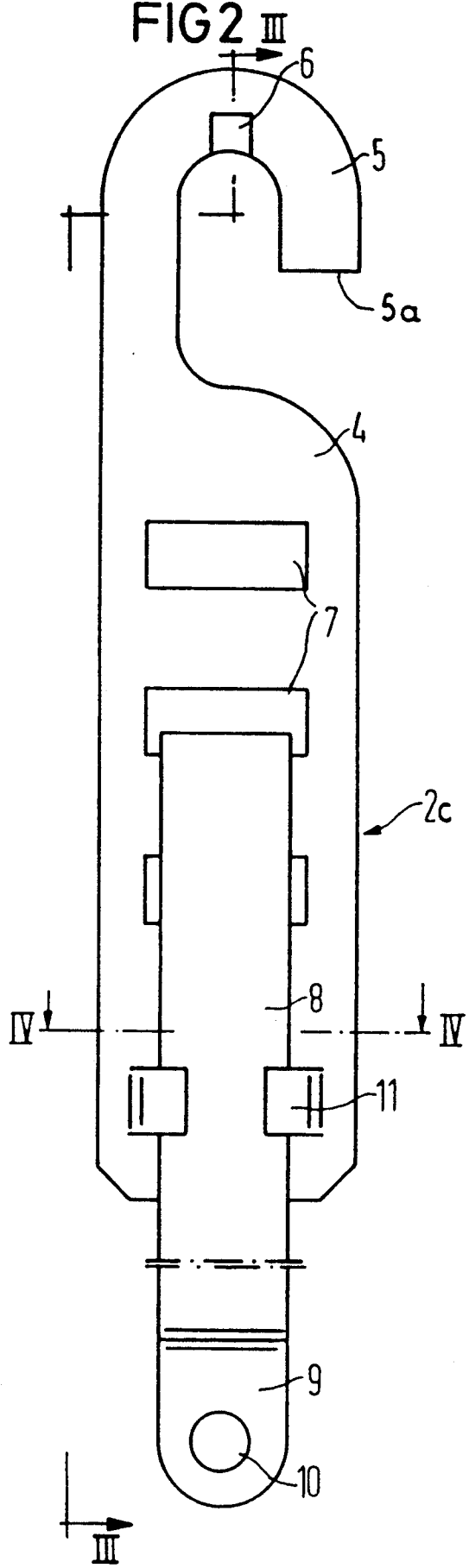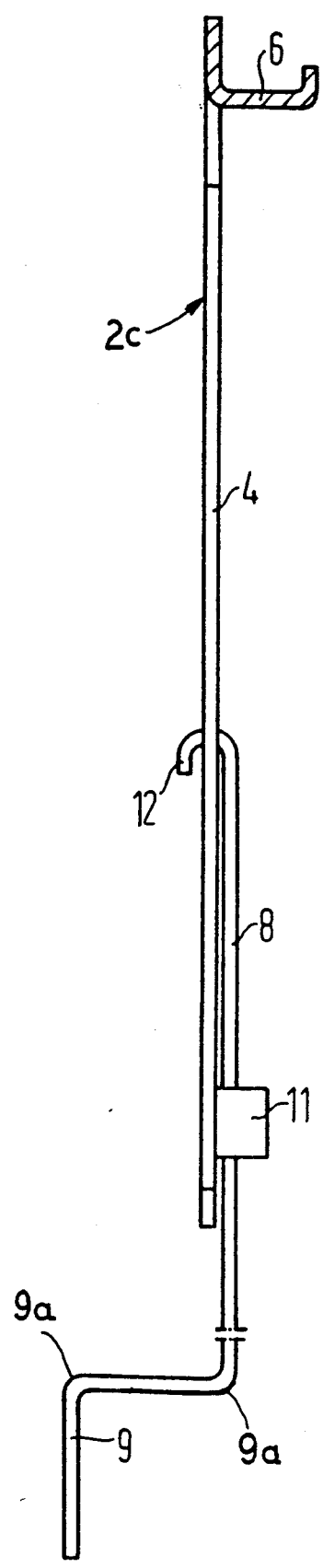

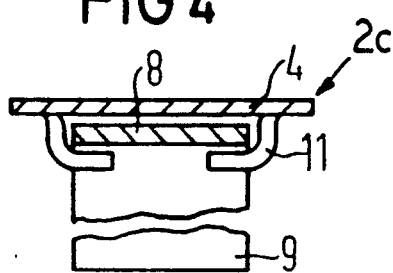
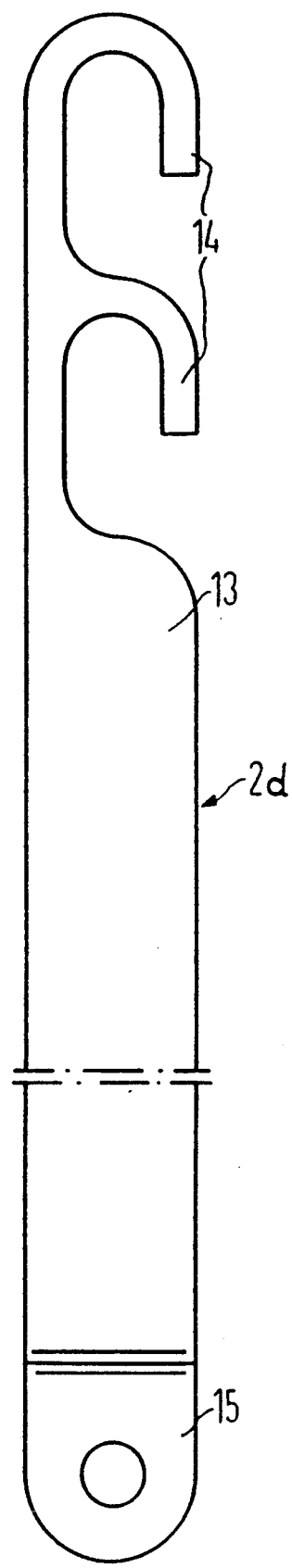

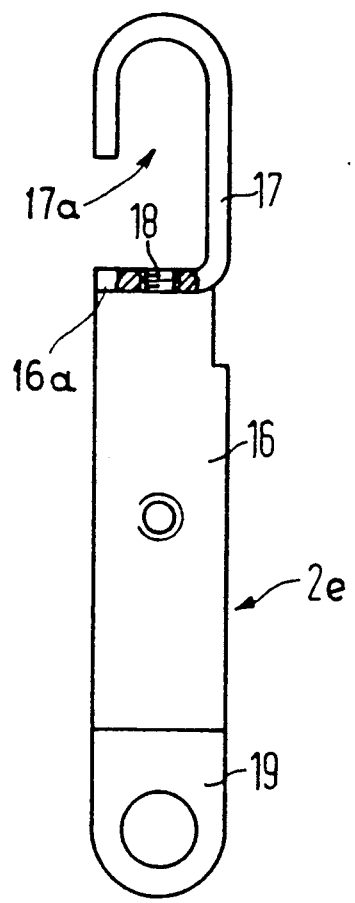
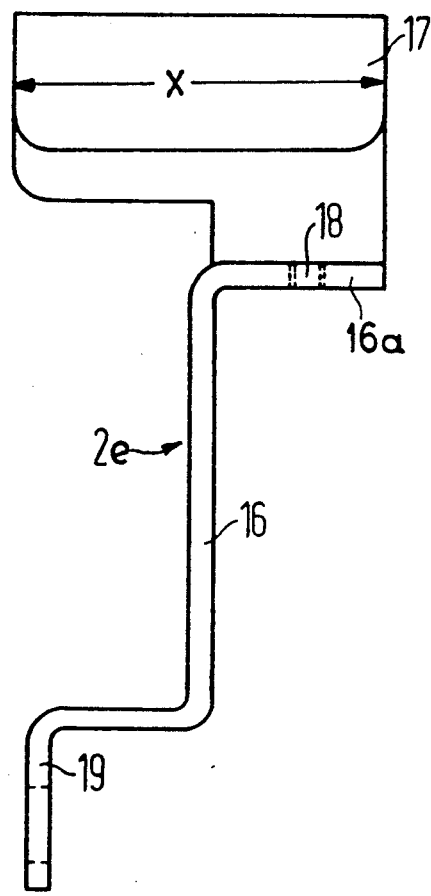

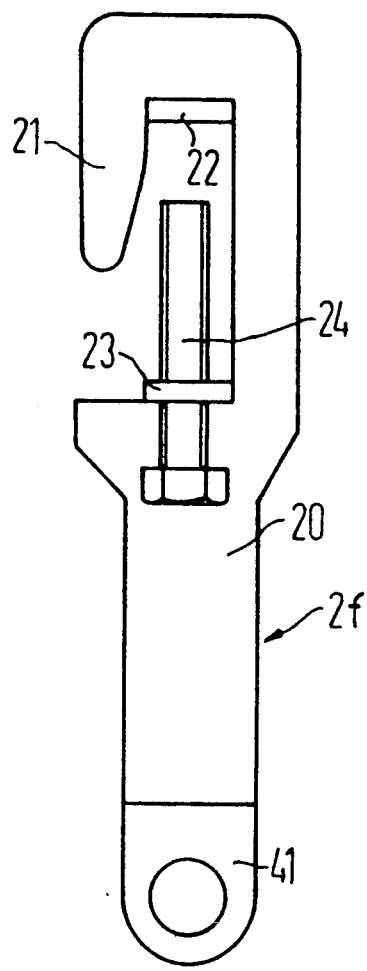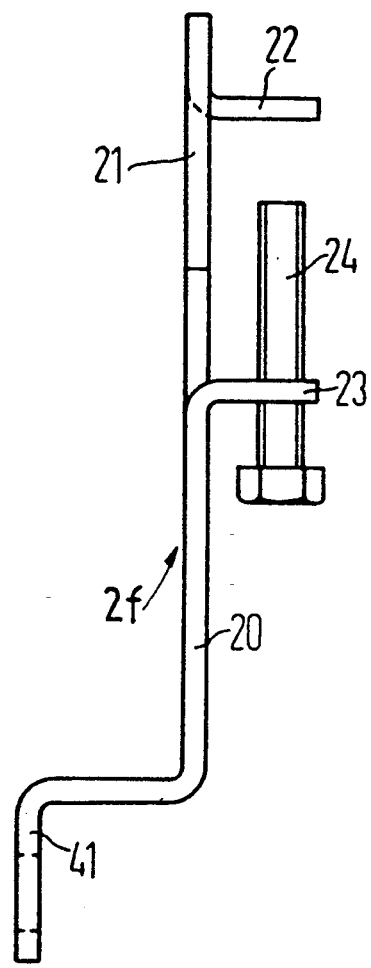

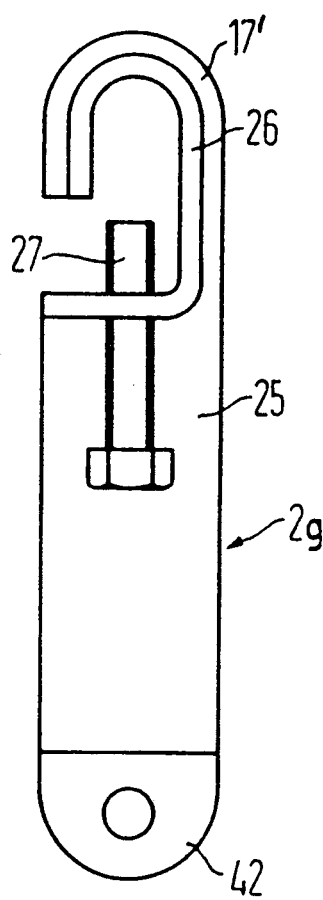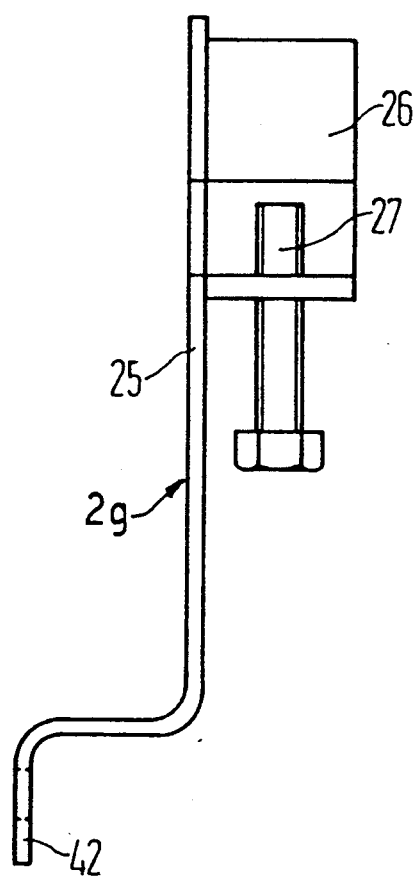

5,314,155

DEVICE FOR SUSPENDING A CABLE SLEEVE ON A SUPPORT CABLE

BACKGROUND OF THE INVENTION

The present invention is directed to a suspension device for suspending a cable fitting or sleeve on a support cable. The suspension device includes a securing part for engaging the support cable and a mounting projection for fastening the device to the cable sleeve or fitting.

German published application 38 05 257 discloses a device for suspending a cable sleeve or fitting on a support cable or wire. The cable sleeve shown in this published application includes two end members with a split sleeve which surrounds the two end members. This cable sleeve is suspended on the support cable by suspension devices which on one end are provided with engagement means that are clamped to the support cable with the assistance of clamp parts and the devices have their other ends engaging corresponding profile or devices of the cable sleeve. A number of mounting steps are required when fixing the suspension device on the support cable and when mounting the cable sleeve on these suspension devices.

SUMMARY OF THE INVENTION

The object of the present invention is to create a suspension device for suspending the cable fitting or sleeve on a support cable which device can be mounted with few manipulative steps and has a corresponding reliability against independent disengagement.

To accomplish these goals, the present invention is directed to an improvement of a suspension device for an overhead cable fitting or sleeve which attaches the cable sleeve on a support cable and comprises a securing part for suspension on the support cable and a mounting lug for securing to the overhead cable fitting or sleeve. The improvements are the securing part is constructed as a hook whose structure provides means for preventing accidentally disengagement of the hook from the support cable and the mounting lug comprises a fastening flange for a lateral attachment to the end seal member of the cable sleeve.

An advantage of the invention compared to the prior art devices are that the suspension devices can be manufactured in a simple way from a band-shaped or strip-shaped material. The appropriate function parts can be fashioned by punching and bends in the simplest embodiments. Thus, for example, the securing part can be formed by a hook-shaped punched out portion wherein seats or flanges for an anti-lift-off devices can be created by bending. In the simplest conceivable way, these anti-lift-off devices, which form means to prevent disengagement of the hook from the support cable, are composed of screw elements so that the introduction opening can be constricted with the screw elements by threading the element into a part after the hook has received the support cable. What this constriction achieves, is that the support cable can no longer pop out from the hook-shaped opening. Additional improvements with respect to the reliability and protection can be achieved by corresponding, simple auxiliaries such as spread portions in the suspension area.

In addition, the mounting auxiliaries at the securing part can be shaped so that the suspension device can be secured to the end face of the cable fitting or sleeve. It is thus guaranteed that the cable sleeve can be opened in its suspended condition. It is, thus, also possible for the cable sleeve to be initially suspended from the support cable without inside assemblies when initially mounted. Since the cable fitting or sleeve is already situated in its position on the support cable, the splicing job can therefore, be simplified.

Other advantages and features of the invention will be readily apparent from the following description of the preferred embodiments, the drawings and claims.

BRIEF DESCRIPTION OF THE DRAWINGS

FIG. 2 is a front view of an adjustable length suspension device according to the present invention;

FIG. 3 is a view taken along line III—III of FIG. 2;

FIG. 4 is a cross-sectional view taken on lines IV—IV of FIG. 2;

FIG. 5 is a front view of an embodiment of the suspension device in accordance with the present invention;

FIG. 6 is a front view of yet another embodiment of a suspension device in accordance with the present invention with portions broken away for purposes of illustration;

FIG. 7 is a side view of the suspension device of FIG. 6;

FIG. 8 is a front view of still further embodiment of the suspension device of the present invention;

FIG. 9 is a side view of the suspension device of FIG. 8;

FIG. 10 is a front view of yet another embodiment of the suspension device of the present invention;

FIG. 11 is a side view of the suspension device of FIG. 10;

DESCRIPTION OF THE PREFERRED EMBODIMENTS

Figure 1:
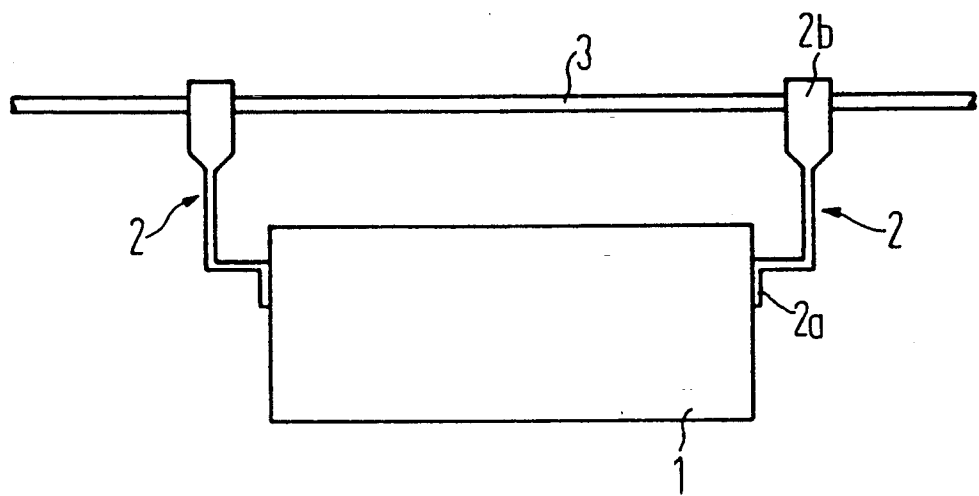
FIG. 1 is a side view showing the suspension devices of the present invention suspending a cable fitting or sleeve on a support cable.

The principles of the present invention are particularly useful when incorporating the suspension device as illustrated in FIG. 1. Two suspension devices 2 have mounting lugs 2a, which are placed against end faces on a cable fitting or sleeve 1, and also have securing parts 2b, which are hooked on a barrier or support cable 3. Thus, the cable sleeve or fitting 1 is suspended from the support cable 3 by the two suspension devices 2.

A longitudinally adjustable suspension device 2c is illustrated in FIGS. 2, 3 and 4 and is formed of a band-shaped securing part 4 that has an upper end provided with a hook 5. A portion of the hook has a bent off flange 6 which is situated in the portion of the hook that engages the support cable and thus as illustrated in FIG. 3 this flange 6 will increase the contact area engaging the support cable to prevent damage thereof. As illustrated, a free leg of the hook has an end surface 5a which extends downward a substantial distance past any cable received in the hook and thus the free leg has a length greater than the diameter of the cable. The securing part 4 has a plurality of spaced punched-out portions 7, which receive a second hook or bent portion 12 (FIG. 3) of a second part 8 which is slidably received in guides 11 formed in the part 4. The part 8 on an end opposite the second hook portion 12 is provided with a mounting lug 9 having a bore or aperture 10 which enables fastening of the part 8 to an end seal of the cable sleeve. As best illustrated in FIG. 3, the lug 9 is offset by two right angle bends 9a, 9a from the plane of the part 8 so that the portion of the lug 9 containing the aperture 12 is offset from the plane of the remaining portion of the part 8. By selecting which of the slots or punched-out portions 7 receives the hook 12, the distance between the flange 6 and the aperture 10 can be changed to provide adjustment in the overall length of the device. As illustrated, the device can be easily made by stamping strips.

An embodiment of the suspension device 2d is illustrated in FIG. 5 and is a single member or part 13, which at one end is provided with two hooks 14 one above the other and at the opposite end is provided with an offset mounting lug 15 similar to the lug 9 in the embodiment of FIGS. 2–4. The presence of two hooks enables adjusting the length from the cable to the mounting lug by selecting one of the two hooks for engagement on the cable.

A third embodiment of the suspension device is illustrated in FIGS. 6 and 7 by the suspension device 2e. The device 2e is a one-piece member which has a band-shaped securing part 16 with a portion 16a bent at right angles and containing a threaded bore 18. A hook portion 17 is bent at right angles from the right portion 16a and as illustrated has a substantial length x which is greater than the width of the portion 16. The mounting lug 19 is offset as the lug 9 of the previous embodiments and is provided with an aperture for securing the lug on the end face of an end seal of a cable sleeve. Once a support cable has been inserted in the hook portion 17, a threaded member such as a screw can be threaded into the bore 18 to constrict the opening or mouth 17a of the hook portion 17 to form an anti-lift-out means for preventing disengagement of the hook 17 from the cable. Thus, after the threaded member has been screwed into the bore 18, the constriction of the opening 17a is such to prevent an accidental popping out of the support cable. If desired, the screw can be threaded until it engages the cable to fix the position of the suspension device 2e on the cable.

In a fourth embodiment of the suspension device 2f illustrated in FIGS. 8 and 9, the securing part is composed of a hook-shaped punched-out portion 21 wherein the punch-outs are laterally bent out as flanges 22 and 23. The flange portion 22 increases the surface contact for the support cable whereas the flange portion 24 has a threaded bore for receiving a screw or a threaded fastener 24 which can be moved into the mouth of the hook portion 21 to constrict or prevent the popping out of the support cable. As in the previous embodiment, the screw 24 can be used to clamp the support cable between the flange 22 and the screw to fix the suspension device 2f on the support cable. As in the previous embodiments, the securing part 20 on an end opposite the hook 21 has an offset mounting lug 41.

Another or fifth embodiment of the suspension device 2g is illustrated in FIGS. 10 and 11. In this device, a securing part 25 is a strip which has a hook portion 17' punched therein. At an end opposite the hook portion, a mounting lug 42 is provided. A band-shaped reinforcement 26 is provided in the area of the hook portion 17' and as illustrated conforms to the hook portion so as to provide an enlarged contact surface for engaging the support cable and also a flange for providing a threaded bore to receive a threaded fastener such as the screw 27 that forms the anti-lift-out device or means. As in the previous embodiment, the screw can be threaded to grip the cable and clamp it between the upper portion of the reinforcement 26 and the screw 27.

Figure 12:
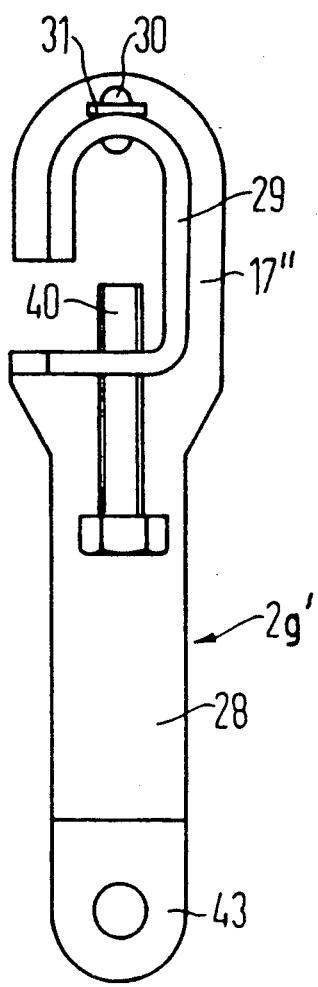
FIG. 12 is a front view of a modification of the suspension device of FIG. 10.

A modification of this embodiment is illustrated at 2g' in FIG. 12 wherein a securing part 28 has a hook portion 17'' at one end and a mounting lug 43 at the other end. To provide reinforcing, reinforcement 29 is secured on the securing part 28 by the assistance of rivets 30 which are engaged in an angle portion or flange 31 bent from the strip forming the hook portion 17''. This reinforcement 29, as in the device of 2g, is provided with a threaded bore for receiving a screw or threaded fastener 40 which can be used to constrict the opening of the hook and to clamp or engage the cable received in the hook.

Figure 13:
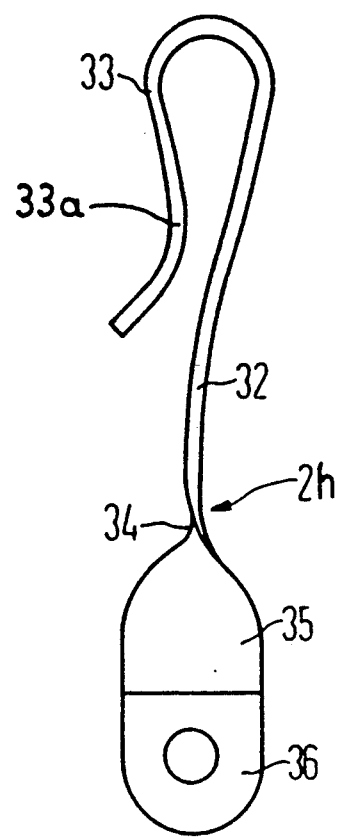
FIG. 13 is a front view of a still further embodiment of a suspension device in accordance with the present invention.

An exemplary embodiment of the suspension device 2h is shown in FIG. 13 and has a band-shaped material which has been twisted through 90° at a region 34 to provide a lower region 35 and an upper region 32 which has a broad seating surface forming a hook end 33. The lower region 35 has a mounting lug 36 which is to be offset as in the previous embodiments. The hook portion 33 has been bent to provide a narrow throat 33a adjacent the free end of the hook portion. The narrow throat 33a will be forced open when the cable is inserted in the hook portion and then do to the resilient nature of the strip material will spring back. Thus, this resilient nature provides the anti-lift-off means to prevent disengagement of the hook portion 33 from the support cable.

Figure 14:
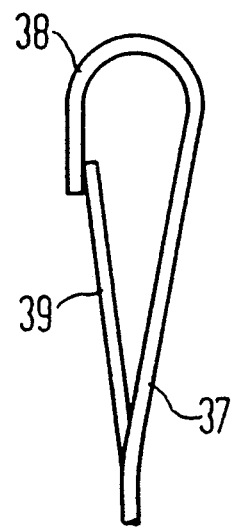
FIG. 14 is a partial front view of a modification of a hook arrangement of a device similar to FIG. 13.

In another modification instead of providing a springback hook end having a narrow throat, a spring part or finger 39 (FIG. 14) has been cut in a strip portion 37 adjacent the hook 38. This resilient finger 39 forms a trigger snap which allows insertion of the cable into the hook portion and then snaps back to close the opening of the hook portion.

Although various minor modifications may be suggested by those versed in the art, it should be understood that we wish to embody within the scope of the patent granted hereon all such modifications as reasonably and properly come within the scope of our contribution to the art.

We claim:

1. In a device for suspending a cable sleeve on a support cable, said device comprising a securing part for engaging a support cable and a mounting lug for fastening to the cable sleeve, the improvements comprising the securing part being fashioned as a hook on one end of a band-shaped member, said hook having an enlarged contact area for engaging the support cable and having means for preventing accidental disengagement of the hook from the support cable, said means including a threaded fastener being threaded in a bore in the member and being positioned to be inserted in an opening of the hook to constrict the opening to prevent removal of a cable from said hook, and the mounting lug being provided on the second end of the member and comprising a fastening flange laterally offset to provide lateral attachment to a seal member on an end face of the cable sleeve.

2. In a device according to claim 1, wherein the enlarged contact area is formed by a second flange bent from the plane of the part.

3. In a device according to claim 2, which includes a third flange adjacent the opening of the hook having said bore for receiving the threaded fastener.

4. In a device according to claim 1, wherein said mounting lug being offset by two right angle bends from the plane of said securing part.

5. In a device according to claim 1, wherein the device includes a portion extending transverse to the plane of the mounting lug to form the enlarged contact area of the hook engaging the support cable.

6. In a device according to claim 5, wherein said portion is a tab bent from the band-shaped material.

7. In a device according to claim 1, wherein the enlarged contact area is formed by the hook being bent in an offset manner.

8. In a device according to claim 1, wherein said member has a right angle bend forming a second flange having said bore.

9. In a device according to claim 8, wherein said second flange has a second right angle bend connecting the hook to said flange.

10. In a device according to claim 9, wherein the enlarged contact area of the hook has a dimension extending parallel to the bend line of the second right angle bend greater than the length of said bend line.

11. In a device according to claim 8, wherein said mounting lug includes two right angle bends to offset the lug in a direction opposite said second flange.

12. In a device according to claim 8, wherein said enlarged contact area is formed by a third flange extending parallel to said second flange with the bore.

13. In a device for suspending a cable sleeve on a support cable, said device comprising a securing part for engaging a support cable and a mounting lug for fastening to the cable sleeve, the improvements comprising said device including a one-piece strip member, said member at one end having a first right angle bend and a second right angle bend forming the mounting lug with a fastening flange laterally offset to provide lateral attachment to a seal member on an end face of the cable sleeve, said member at an end opposite the one end having a third right angle bend forming a second flange extending in an opposite direction to the fastening flange, said securing part being a hook extending from said second flange, said second flange having means including a threaded fastener extending from a bore in said second flange for preventing accidental disengagement of the hook from the support cable.

14. In a device according to claim 13, wherein said hook being formed by a fourth right angle bend extends perpendicular to the third right angle bend.

* * * * *